United States Patent [19]
Hamlen

[11] 3,894,323
[45] July 15, 1975

[54] CONVEYOR BELT ROLLERS
[76] Inventor: Edmund Lorne Hamlen, 39 Lawrence Ave. East, Toronto, Ontario, Canada
[22] Filed: Oct. 24, 1974
[21] Appl. No.: 517,517

[52] U.S. Cl.................. 29/116 R; 29/123; 308/77
[51] Int. Cl............................................ B21b 13/02
[58] Field of Search....... 29/110, 116 R, 123, 129.5, 29/130, 132; 308/77

[56] References Cited
UNITED STATES PATENTS

| | | |
|---|---|---|
| 2,391,670 | 12/1945 | Bay et al. .............................. 308/77 |
| 2,877,674 | 3/1959 | Armacost et al. ..................... 308/77 |
| 3,075,632 | 1/1963 | Watt .............................. 29/116 R X |
| 3,416,638 | 12/1968 | Buck................................. 29/110 X |
| 3,566,497 | 3/1971 | Hamlen.............................. 29/123 |
| 3,797,082 | 3/1974 | Brunes.............................. 29/116 R |

Primary Examiner—Alfred R. Guest
Attorney, Agent, or Firm—George H. Riches and Associates

[57] ABSTRACT

A heat dissipating means for a conveyor roller consisting of a cylindrical plastic roller rotatably mounted on a shaft, the heat dissipating means being embedded in the plastic roller to touch the bearing and transfer heat from the bearing to the outside of the roller.

4 Claims, 6 Drawing Figures

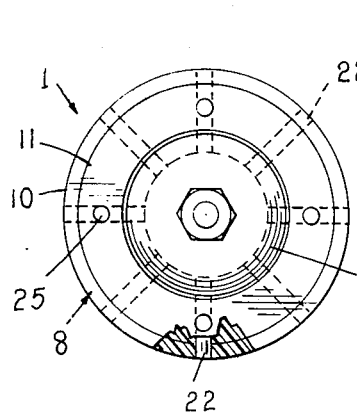
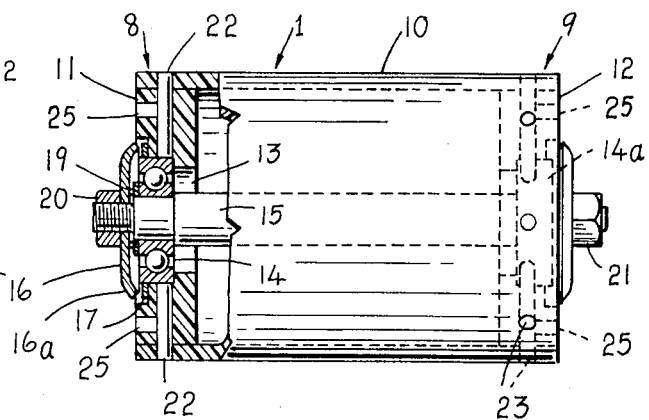
FIG. 2  FIG. 1
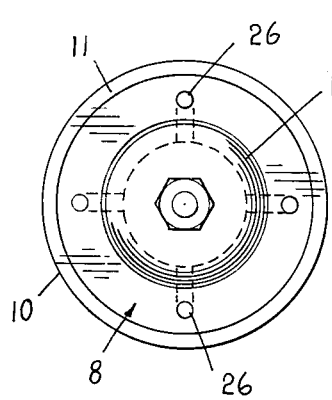
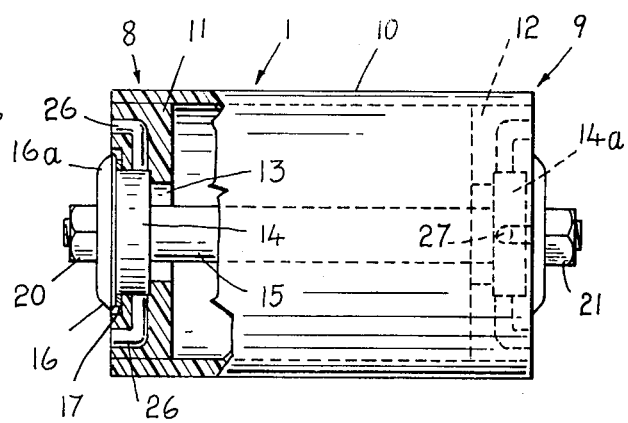
FIG. 4  FIG. 3
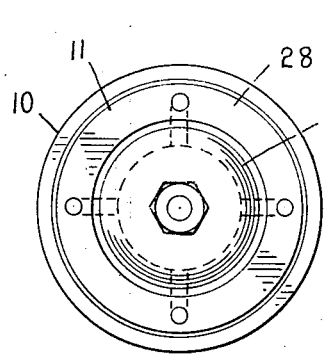
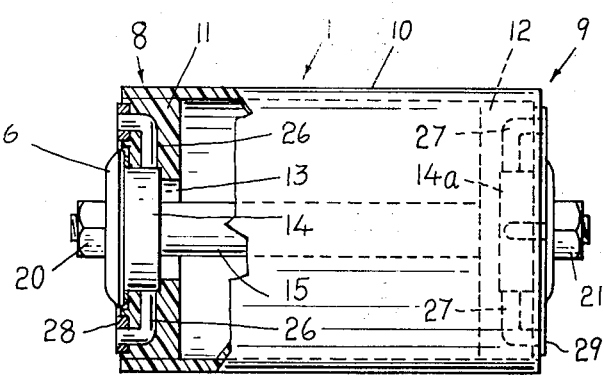
FIG. 6  FIG. 5

CONVEYOR BELT ROLLERS

This invention relates to an improvement on my U.S. Pat. No. 3,566,497 dated Mar. 2, 1971 and my corresponding Canadian Pat. No. 873,714 dated June 22, 1971.

The said prior patents disclosed and described a conveyor roller generally consisting of, in combination:
  a. a non-metallic corrosion resistant, non-magnetic tubular member;
  b. a non-metallic corrosion resistant end cap sealed in each end of said tubular member, said end cap having a central bore therethrough; and
  c. a bearing seated in the bore of each end cap and secured therein.

A problem with the non-metallic corrosion resistant roller, when made of plastic, is that the plastic roller contains heat built up by friction in the bearings which have a tendency to burn out or seize. With this problem in mind, the invention to be described, solves the problem by providing a heat dissipating means whereby the heat built up by friction will be transferred from the bearings to the outside.

The three embodiments of the invention will be described with reference to the accompanying drawings, in which:

FIGS. 1 and 2 are is a front and end elevation partly in crosssection of an idler constructed in accordance with the invention;

FIGS. 3 and 4 is a front and end elevation, partly in cross section illustrating an alternative construction; and FIGS. 5 and 6 are a front and end of another alternative construction.

The roller 1 is generally similar to the one described in the said prior patents and comprises a tubular member 10, a pair of end caps 11,12 which are sealed into the tubular member at opposite ends which are indicated by numbers 8,9, each cap having an axial bore 13 therethrough; a bearing 14,14a mounted in each axial bore as shown; a shaft 15 which has its opposite ends journalled in the respective bearings 14,14a; a steel spacer 16; a felt dust excluder 17; a dust shield 16a and an O-ring 19, the whole assembly being held together in assembled position by roller nuts 20,21.

The member 10 and the ends can either be cast or molded in one piece, preferably plastic, such as glass fibres, bonded together by a suitable percentage of a resin selected from the group consisting of polyesters, epoxies, vinyl esters, phenolic, polyethylene, acrylonitrile-butadiene-styrene, polyvinyl chloride, polyvinyl dichloride, or a combination of the same except some may not require a fibre binder or filler as described in the above mentioned prior patents.

The heat dissipating means consist of a plurality of metal pins or cast pieces 22,23 of two or more embedded in the end caps 11,12, and extending radially from the bearing 14,14a. The pins can be solid pins, tubes and can be of any design, shape or size, cast, rolled or extruded. However, they must be of uniform size and weight in order not to effect the balance of the roller. They can be made of any material that is a good conductor of heat such as steel, alloys of steel, aluminum, copper, etc. In the embodiment illustrated in FIG. 1, eight such pins are provided, four each adjacent the right and left hand ends of the roller and uniformly spaced circumferentially to maintain balance and avoid a vibratory action. Each of the pins 22,23 touches the respective bearing 14, 14a and extends to the peripheral surface of the roller 1. The ends of the pins terminate flush with the periphery of the roller 1. To provide further heat dissipation, each end cap of the roller 1 may be drilled with two or more uniformly spaced holes 25.

FIG. 3 illustrates a modified form of heat dissipating means consisting of metal pins 26,27. The pins are identical, but each pin is bent (as shown) within the end caps 11,12 to terminate flush on the outside surface of the roller end, which ends are indicated by the numbers 8,9 respectively, to avoid catching on anything or touching an adjacent roller.

FIG. 5 illustrates a further modification. In essential details, it is similar to the structure of FIG. 3. To provide for additional heat transfer, annular plates 28,29, one at each end are provided. These plates may be partially embedded into the respective caps 11,12 and are secured to the pins 26,27 the outer ends of the pins 26,27 touch the bearings 14, 14a and the end caps 11,12 respectively. The plates 28,29 are provided with holes into which the terminal ends of the respective pins 26,27 are fitted and provide metal to metal contact between the plates and the pin. This structure provides good heat transfer from the bearings to the outside.

It will be apparent to those skilled in the art that the roller of the present invention can be modified by a person skilled in the art without departing from the subject matter of the invention.

What I claim is:

1. In a conveyor roller having a corrosion resistant plastic roller mounted on a rotatable shaft, said shaft being journalled in bearings at each end thereof, means for conducting heat from the bearings comprising heat conducting pins embedded in the plastic, said pins of two or more, being disposed to extend radially from said axle adjacent the said bearings to the outside of said roller, all of said pins being uniformly spaced circumferentially.

2. In a conveyor roller according to claim 1 in which the pins extend in a straight line from the shaft to the circumference of the roller, the outer terminal end of the pins being flush with the periphery of the roller.

3. In a conveyor roller according to claim 1 wherein the pins have a bent portion extending through the adjacent end of the roller, substantially parallel to said shaft, the terminal end of the bent portion being substantially flush with the end surface of the roller.

4. In a conveyor roller according to claim 3, a heat transmitting circular member is mounted on said shaft between each bearing and the respective end of said roller and the terminal ends of the pins to the respective heat transmitting circular member.

* * * * *